United States Patent [19]

Wilson

[11] Patent Number: 5,787,719
[45] Date of Patent: Aug. 4, 1998

[54] MOBILE SEAFOOD PROCESSING UNIT

[76] Inventor: Robert F. Wilson, 1301 Dickerson Bay Dr., Gallatin, Tenn. 37066

[21] Appl. No.: 811,353

[22] Filed: Mar. 4, 1997

[51] Int. Cl.$^6$ .................................................. F25B 27/00
[52] U.S. Cl. ........................... 62/236; 62/239; 296/22
[58] Field of Search ................... 62/239, 236; 296/22, 296/24.1

[56] References Cited

U.S. PATENT DOCUMENTS

| | | | |
|---|---|---|---|
| 3,866,433 | 2/1975 | Krug | 62/239 |
| 3,956,126 | 5/1976 | Streebin et al. | 210/104 |
| 4,632,836 | 12/1986 | Abbott et al. | 296/22 |
| 4,666,204 | 5/1987 | Reinholtz | 296/24.1 |
| 4,912,338 | 3/1990 | Bingham | 296/24.1 |
| 4,919,477 | 4/1990 | Bingham et al. | 296/24.1 |
| 4,971,377 | 11/1990 | Aquilante | 296/22 |
| 5,269,149 | 12/1993 | Zeidler | 62/239 |

*Primary Examiner*—William E. Tapolcai
*Attorney, Agent, or Firm*—Waddey & Patterson; Mark J. Patterson

[57] ABSTRACT

A self-contained seafood processing and storage system is described. The system includes a cooler section with refrigeration and processing section for seafood and utensils washed down at sanitation facilities, including fresh bacteria contaminated fluid and debris and waste water (septic) storage, water heater, frozen storage refrigeration, and on-board generator. All of this is mounted on or in an insulated truck body. The purpose of this system is to deliver fresh seafood to retailers and restaurants where the proprietors can view and select seafood on a daily basis before it is delivered for use.

22 Claims, 11 Drawing Sheets

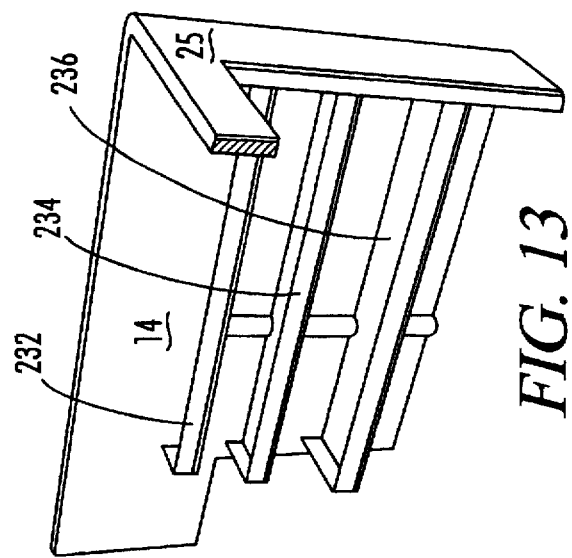
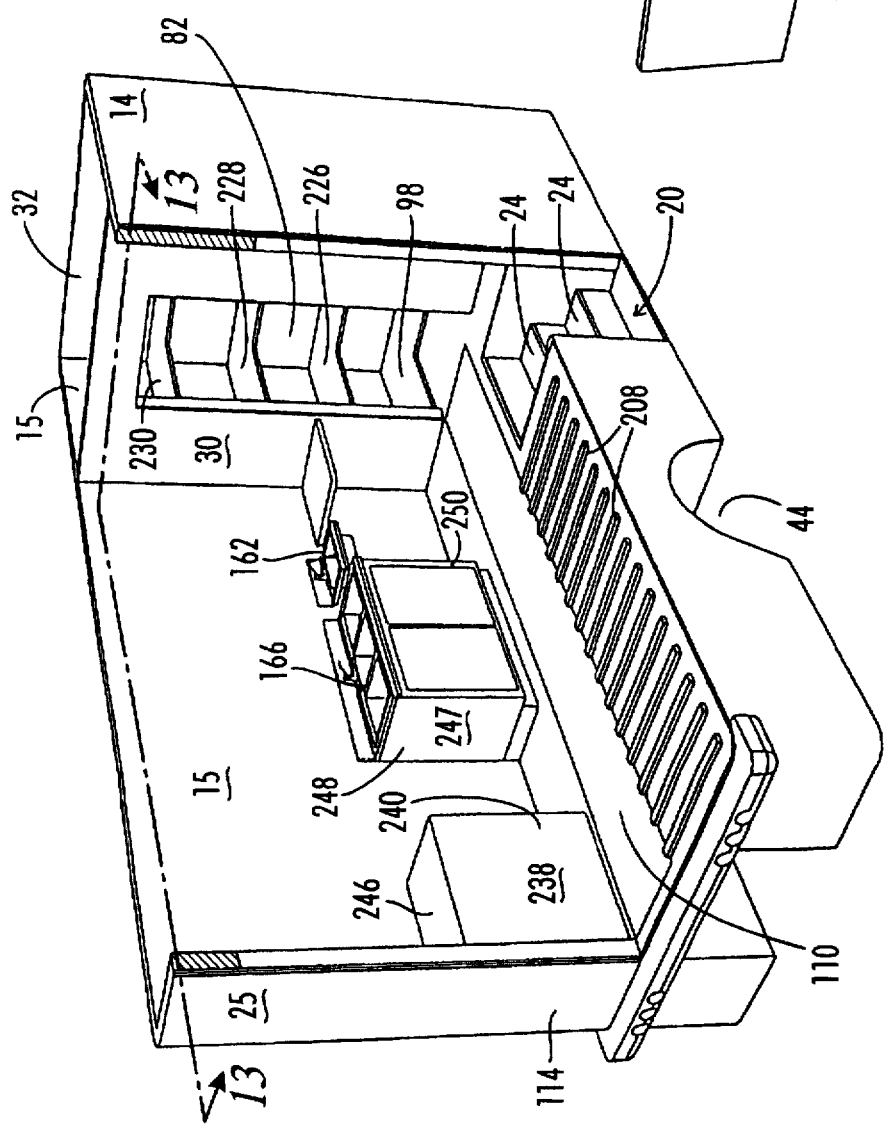
*FIG. 12*
*FIG. 13*

MOBILE SEAFOOD PROCESSING UNIT

APPLICATION FOR UNITED STATES LETTERS PATENT

Be it known that I, Robert F. Wilson, a citizen of the United States, residing at 1301 Dickerson Bay Drive, Gallatin, Tenn. 37066, have invented a new and useful "Mobile Seafood Processing Unit".

BACKGROUND OF THE INVENTION

The present invention relates generally to a seafood processing unit and more particularly to a mobile seafood processing unit that can be used to deliver fresh seafood directly to stores, restaurants and the like.

It will be appreciated by those having ordinary skill in the art that it is difficult to get fresh seafood to the place of consumption, whether it be a restaurant or a supermarket. These difficulties are complicated by supermarket distribution systems and distances from primary seafood sources to inland sites.

The situation is further complicated by unscrupulous seafood marketers, who often disguise cheaper pieces of seafood as more expensive pieces. These abuses and other problems in the seafood industry are documented in Consumer Reports, February 1992. These abuses could be alleviated if the retailer or restaurateur or chef had access to a seafood transport and processing unit wherein the individual could select a portion of seafood in its unprocessed form and thereafter observe the subsequent processing to suitable portions for sale to consumers.

There have been described in the prior art certain mobile food storage transportation and preparation systems as in U.S. Pat. Nos. 4,270,319; 4,270,598; 4,505,126; and 4,601,509. However, none of these devices is particularly suited for the transportation and preparation of fresh seafood. There is also described in U.S. Pat. No. 3,261,176 a fishing boat with integral cold and frozen storage areas and conveyer systems for loading and unloading; but, this system cannot accomplish the delivery of fresh seafood to inlet sites.

What is needed, then, is a transport system/unit for delivering fresh seafood directly to the door of the retailer or restaurant owner so that daily selections can be made and any final processing taken immediately thereafter. Such a system is presently lacking in the prior art.

SUMMARY OF THE INVENTION

A mobile seafood processing unit comprising an insulated body with at least one user access door; a refrigeration system; a waste handling system; a food processing station, the food processing station located within said insulated body and proximate to the refrigeration system and in cooperative operation with the waste handling system; and a power system is described.

In the mobile seafood processing unit of this invention, the refrigeration system can further comprise a cooler section and a freezer section. The waste system can further comprise a septic tank mounted to the body, the septic tank connected to a series of drains in operative communication with the food processing station. A lighting system can also be mounted within the insulated body.

In the mobile seafood processing unit according this invention, the food processing station can further comprise a work bench and a series of sinks, the sinks in fluid communication with the waste handling system. At least one step can be mounted within the at least one access door. The mobile seafood processing unit can further comprise an additional access door. The additional access door can be mounted along a rear wall of the body and the first user access door can be formed in a side wall of the body.

The food processing station can further comprises at least one shelf mounted in the cooling section and at least one shelf mounted in a freezer section of the refrigeration system. The power system can comprises a generator. The mobile seafood processing unit can also include a receptacle for connecting the power system of the mobile seafood processing unit to an external power source. Additionally, the mobile seafood processing unit can further comprise an ice bin mounted within the body.

Accordingly, it is an object of this invention to provide a mobile seafood processing unit that can be used to deliver fresh seafood to retailers and restaurateurs where the proprietors can view and select seafood on a daily basis before it is purchased for use.

It is an object of this invention to provide a mobile seafood transport system wherein final processing of the seafood to consumer usable products can be done directly within the system.

It is an object of this invention to provide a mobile transporting seafood processing unit that includes a refrigeration system, a waste processing unit and a food processing station.

Other objects of this invention will be apparent from the foregoing detailed description.

BRIEF DESCRIPTION OF THE DRAWINGS

FIG. 12 is a cut away perspective view of the mobile seafood processing unit of this invention.

FIG. 13 is an exploded view of the shelves included in the cooler section taken along the lines 13—13 in FIG. 12.

DESCRIPTION OF THE PREFERRED EMBODIMENT

Figure 1:
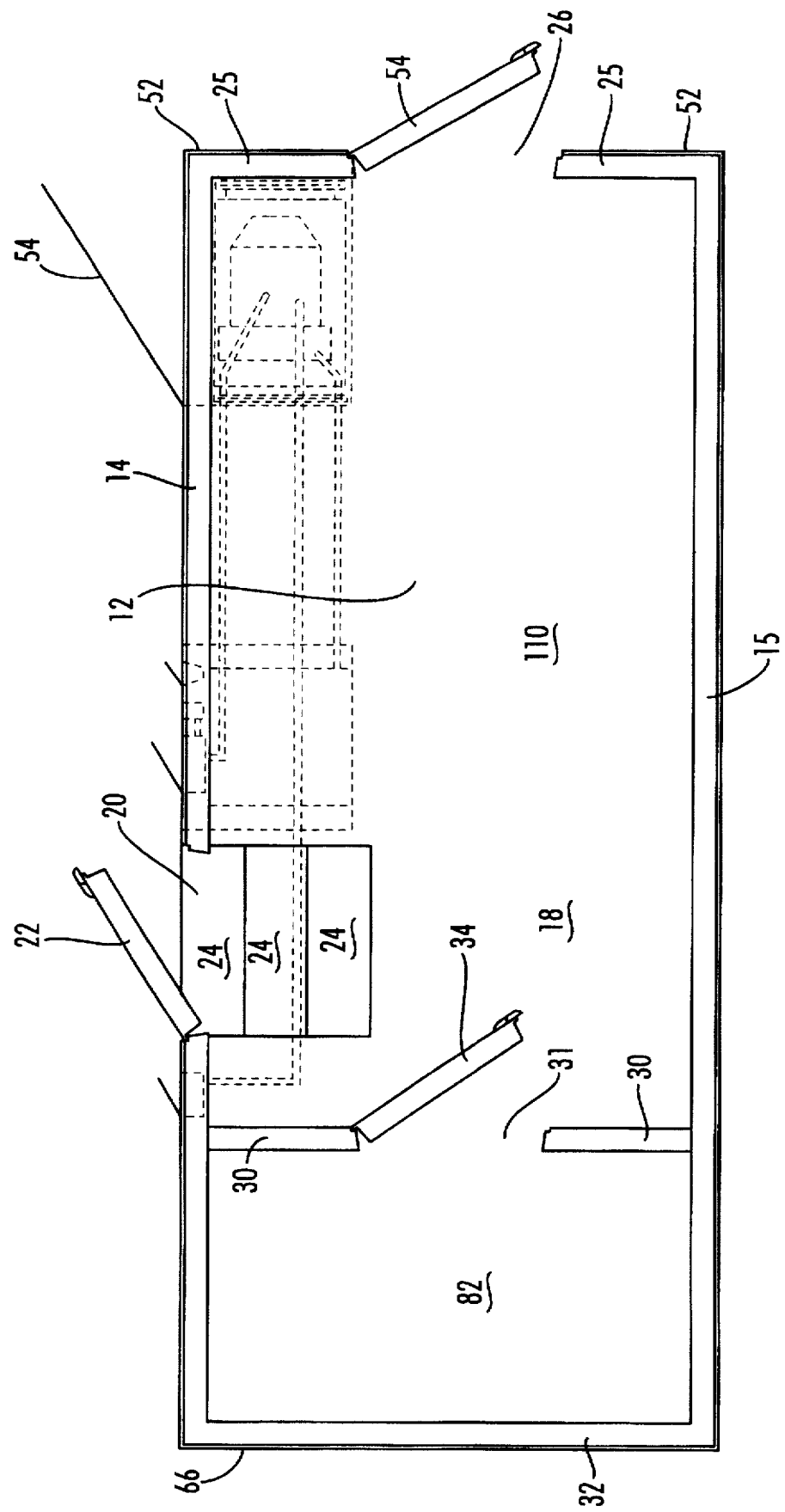
FIG. 1 is a top cut away view of the mobile seafood processing unit of this invention.

In the foregoing detailed description, reference is made to front and rear, left and night, top and bottom, and other directional terms. These directional terms are used to facilitate the description of the invention and should not be construed as limitations.

Referring now to the drawings, wherein like numerals refer to like parts throughout, the mobile seafood processing unit of this invention is referred to generally at 10. Unit 10 comprises an insulated truck body 12. The preferred truck body 12 is 240 inches long by 96 inches wide by 96 inches tall with 4 inches of insulation along all walls, ceiling and floor.

Referring now to FIGS. 1, 8, 9, 12 and 13, insulated truck body 12 includes right side wall 14 and left side wall 15, ceiling 16 and floor 18. A side step entrance 20 is formed in right side wall 14, and preferably, side step entrance 20 is 36 inches wide and 72 inches tall with an insulated door 22 and three steps 24 for easy access from street level. A rear entrance 26 is formed in rear wall 25 and is particularly used for loading product into truck body 12. Rear entrance 26 also includes insulated door 28. Rear entrance 26 is preferably 36 inches wide and at a height as conventional for a standard loading dock. A bulkhead wall 30 is formed within truck body 12, approximately 52 inches from front wall 32. Bulkhead wall 30 also includes 4 inches of insulation as well as a 36 inch wide insulated door 34, which spans freezer entrance 31. Bulkhead wall 30 separates body 12 into freezer section 82 and cooler section 110.

Figure 2:
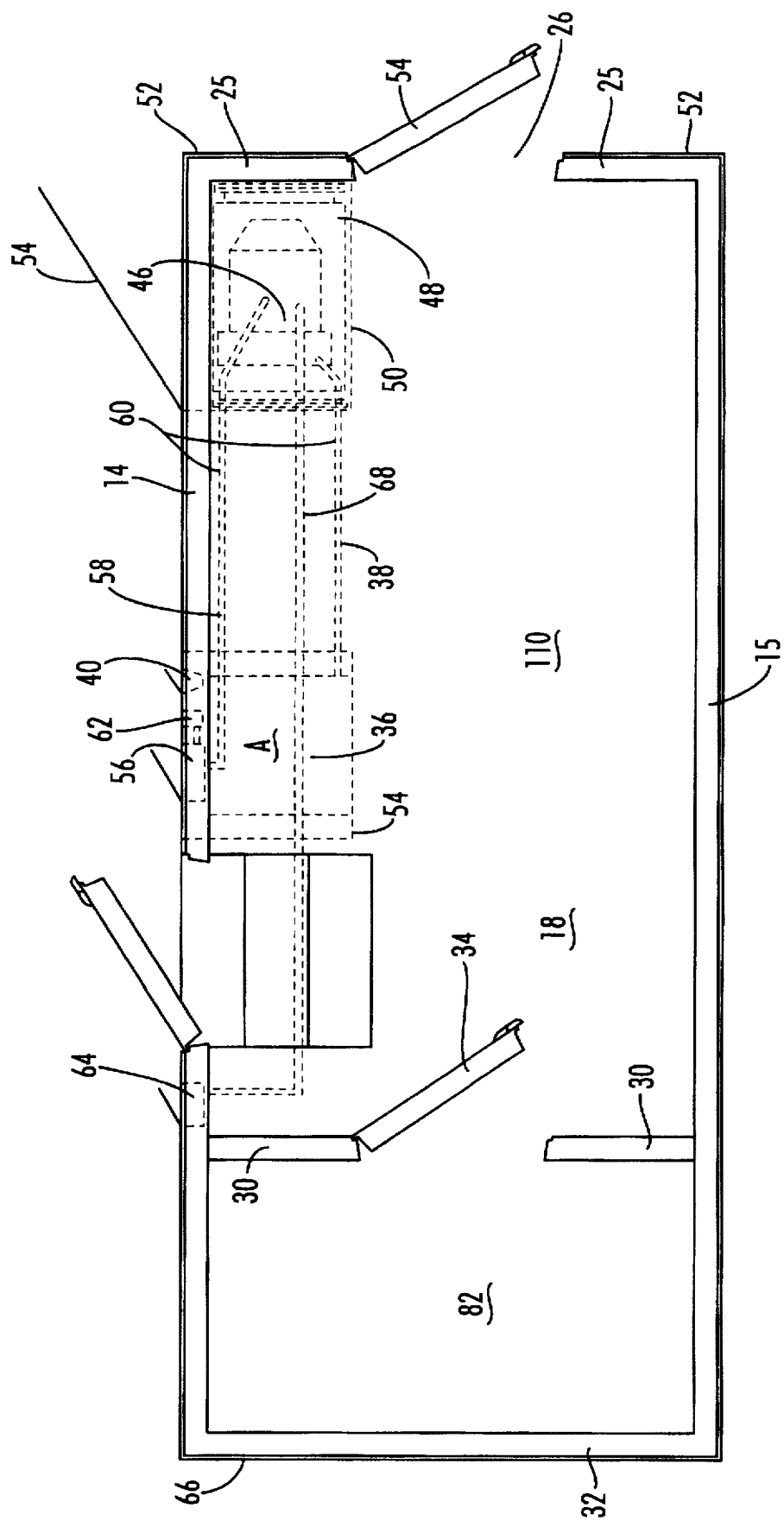
FIG. 2 is a top cut away view of the system of the mobile seafood processing unit of this invention wherein the fuel and power systems are depicted in shadow.
Figure 8:
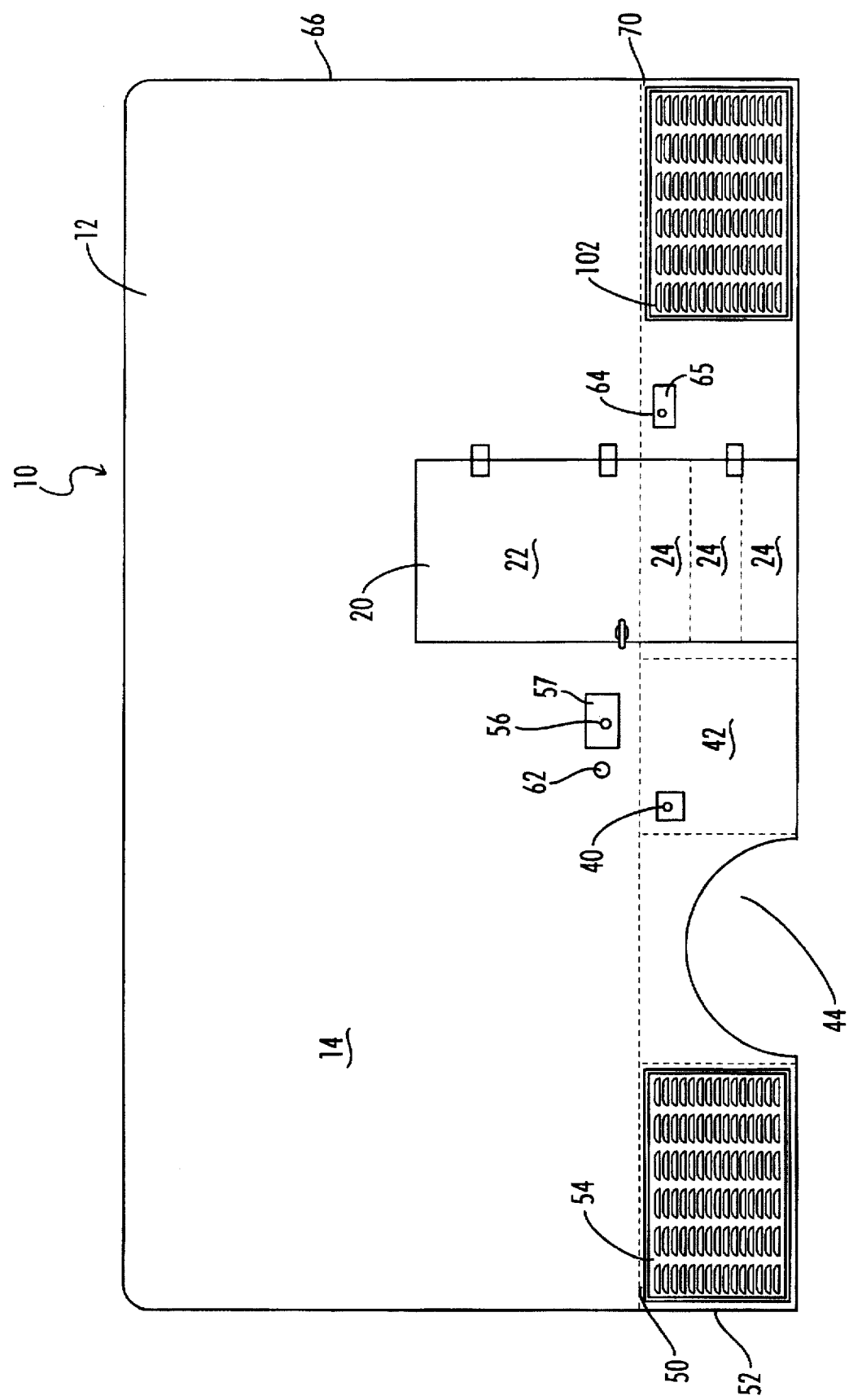
FIG. 8 is the right side exterior view of the mobile seafood processing unit of this invention.

Referring now to FIG. 2 and 8, the fuel and main power system A of unit 10 are described. The fuel system includes a fuel tank 36 which is 15 gallon capacity. The fuel from fuel tank 36 is used to operate the utilities within truck body 12. Fuel line 38 runs from fuel tank 36 to power generator 46. Line 38 runs under floor 18 from tank 36 to generator 46. As seen in FIG. 2 and in FIG. 8, fuel tank 36 is accessed via fuel filler door 40. Fuel tank 36 is mounted within fuel tank compartment 42. Fuel tank compartment 42 is 34 inches wide by 30 inches deep by 30 inches high and is mounted under truck body 12 between wheel well 44 and side step entrance 20.

Continuing on FIGS. 2 and 8, power generator 46, which produces a 10.3 kW maximum load, is mounted on a slide out carriage 48 for easy access. Generator 46 and carriage 48 are mounted with power generator compartment 50. Power generator compartment 50 is 48 inches wide by 30 inches high by 30 inches deep and is mounted under truck body 12 between wheel well 44 and rear end 52 of truck body 12. Power generator compartment 50 is accessed via power generator compartment door 54 which is preferably 45 inches long by 28 inches high and includes vents for proper air flow. A suitable power generator is manufactured by ONAN as Model Nos. 6.5 NHD-FB-1C; 6.5 NHD-FP-30502C; 5.0 NHD-FN-1B; and 5.0 NHD-FN-30502B.

Continuing on FIGS. 2 and 8, main breaker box 56 is mounted 10 inches from side step entrance towards rear end 52 of body 12 and 16 inches above floor 18 of body 12. The breaker box 56 and all junction boxes are outdoor or weather-proof quality. Main breaker box 56 controls all power used in unit 10. Main power line 58 runs from generator 46 to breaker box 56 through conduit pipe 60. In unit 10, all wiring is run through conduit pipes 60 that are mounted under floor 18 of body 12. A power converter 62 is also provided and enables the electrical system to be plugged in to an external AC outlet so that the system can operate during the night while generator 46 is off. Power converter 62 is a conventional ship-to-shore hook up or a is conventional connection such as found on a recreational vehicle or camper.

Continuing on FIGS. 2 and 8, a gauges box 64 is mounted 16 inches above floor 18 of body 12 and 6 inches from side step entrance towards front end 66 of body 12. All gauges are mounted into gauges box 64 and include temperature, fuel level, RPM and the like. A gauges line 68 runs from power generator 46 to gauges box 64, also through a conduit pipe.

Figure 3:
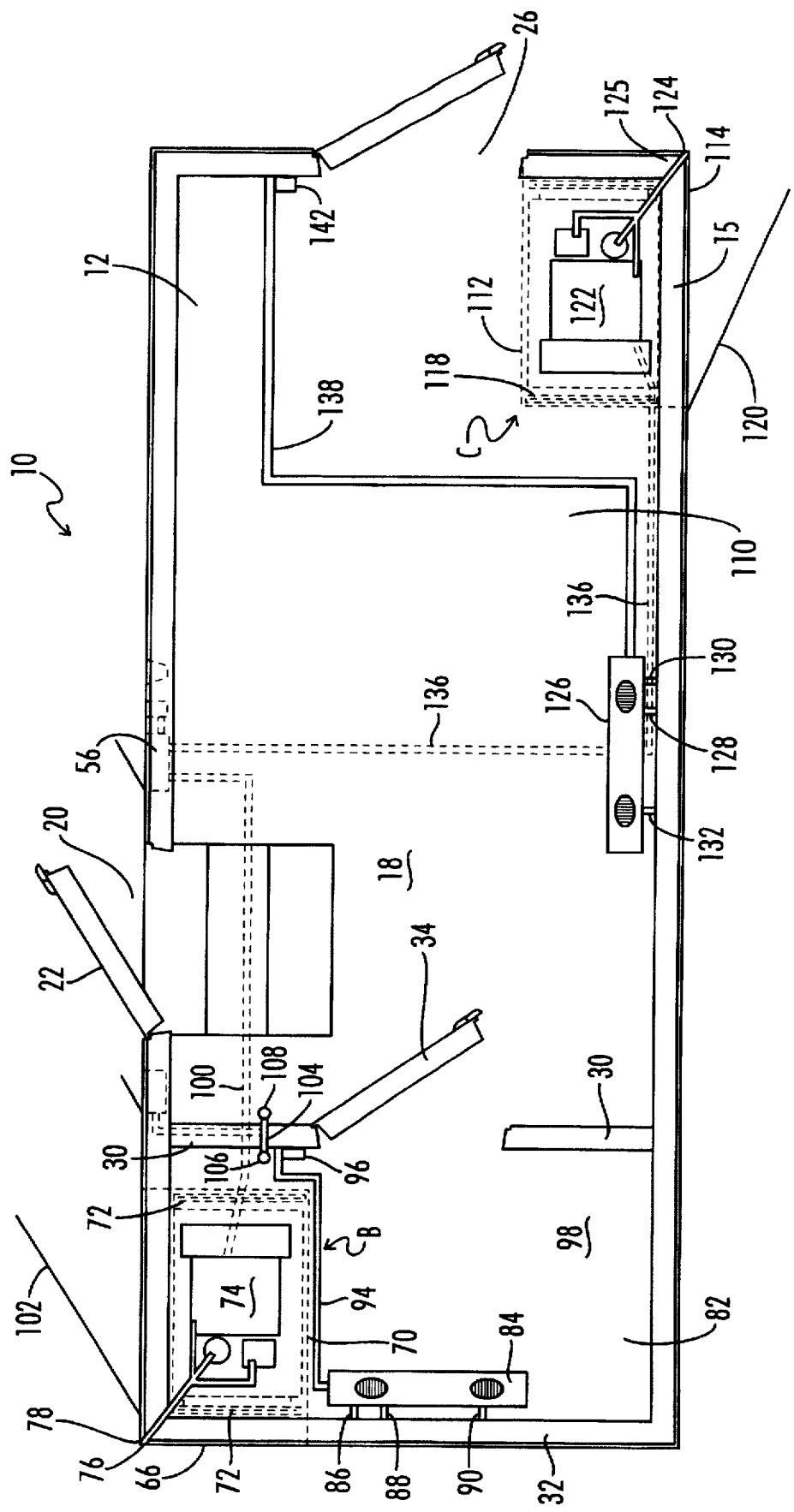
FIG. 3 is a top cut away view of the mobile seafood processing unit of this invention depicting the refrigeration systems of the invention.

Referring now to FIG. 3 and 8, the details of the compressor system B for the freezer section of the unit 10 are described. Freezer section 82 is set off from cooler section 110 of truck body 12 by bulkhead wall 30. Freezer section 82 is cooled by freezer compressor 74. Freezer compressor 74 is mounted within freezer compressor compartments 70 on a slide out carriage 72 for easy access. Freezer compressor compartment 70 is mounted under body 12 and is 48 inches wide by 30 inches deep by 30 inches high mounted from front end 66 of body 12 toward side step entrance 20. Freezer compressor 74 draws a 3 kW maximum load. An acceptable freezer compressor is manufactured by McCopeland Corporation of Sydney, Ohio 45365-0669 under Unit Model No. TSAH-0050, among a variety of others.

Continuing on FIG. 3, refrigerant and power line and conduit pipe 76 are mounted though right front corner 78 of body 12 up to ceiling of freezer section 82 then through front insulated wall 32 to blower 84. A power line 86 runs from compressor 74 to operate fan blower 84. Refrigerant lines 88 and 90 circulate refrigerant from the blowers 84 to compressor 74. Particularly, line 88 carries refrigerant to the blowers 84 and line 90 returns refrigerant to the compressor. Blower 84 is a double fan blower system mounted suspending from ceiling and situated in the center of front insulated wall 32. A thermostat line 94 is mounted to the ceiling of freezer section 82 and runs down to thermostat 96 that is mounted on bulkhead wall 30. Thermostat 96 controls temperature and freezer section 82 and is mounted on the bulkhead wall 30 to the right of freezer door 34 approximately 50 inches up from floor 98 of freezer section 82. Power line 100 runs under floor 18 of body 12 to compressor department 70. Power line 100 connects main breaker box 56 to freezer compressor 74. A door 102 leads to freezer compressor compartment 70. Door 102 is vented to ensure proper air flow.

Continuing on FIG. 3, temperature gauge lines 104 run through bulkhead wall 30. These lines connect temperature gauges for freezer section 82 and cooler section 110. Lines 104 end in temperature probes 106 and 108, probe 106 extending towards freezer section 82 and probe 108 extending towards cooler section 110.

Figure 9:
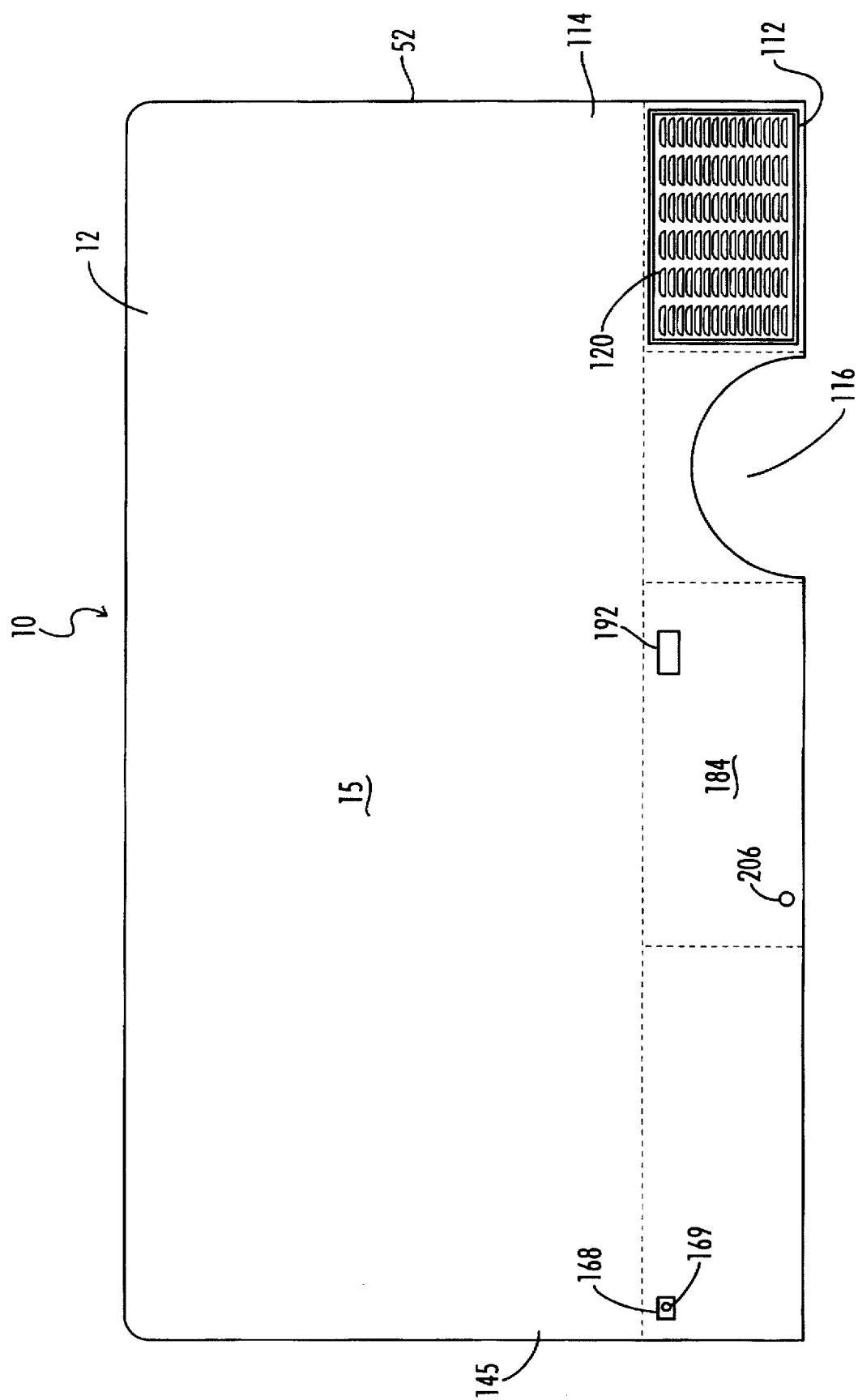
FIG. 9 is the left side exterior view of the mobile seafood processing unit of this invention.

Continuing on FIGS. 3 and 9, cooler compressor system C is also depicted. A cooler compressor compartment 112 is mounted under truck body 12 on the rear left side 114 from left rear wheel well 116 to the rear end 52 of body 12. Cooler compressor compartment 112 is approximately 48 inches long by approximately 30 inches deep by approximately 30 inches high. Within cooler compressor compartment 112, there is mounted cooler compressor 122 on a slide out carriage 118 for easy access. Access is provided via cooler compressor compartment door 120 which is 45 inches wide by 20 inches high and is vented to assure proper air flow. Cooler compressor 122 draws in approximately 3 kW maximum power load. A suitable example for a cooler compressor is manufactured by McCopeland Corporation of Sydney, Ohio 45365-0669 under Unit Model No. TSAH-0050, among a variety of others.

Continuing on FIG. 3, refrigerant and power lines 124 in a conduit pipe run up left rear corner 125 of body 12 through left cooler insulated wall 15 to blower 126. A first refrigerant line 128 runs from cooler compressor to fan blower 126 and a second refrigerant line 130 runs from blower 126 back to cooler compressor 122 to circulate refrigerant. Power lines 132 run from compressor 122 to fan blower 126 and provide power to fan blower 126. Fan blower 126 is a double fan blower system and is suspended from the ceiling of the cooler section 110 centered on left insulated wall 15. Power lines 136 are mounted under floor 18 of body 12 and run from cooler compressor 122 to junction box 127 to main breaker box 56.

Continuing on FIG. 3, a thermostat line 138 runs along cooler ceiling section 134 across to rear wall 25 and down to thermostat 142. Thermostat 142 controls temperature and cooler section 110 and is located 6 inches to the right of rear entrance 26 and 50 inches up from floor 18.

Figure 4:
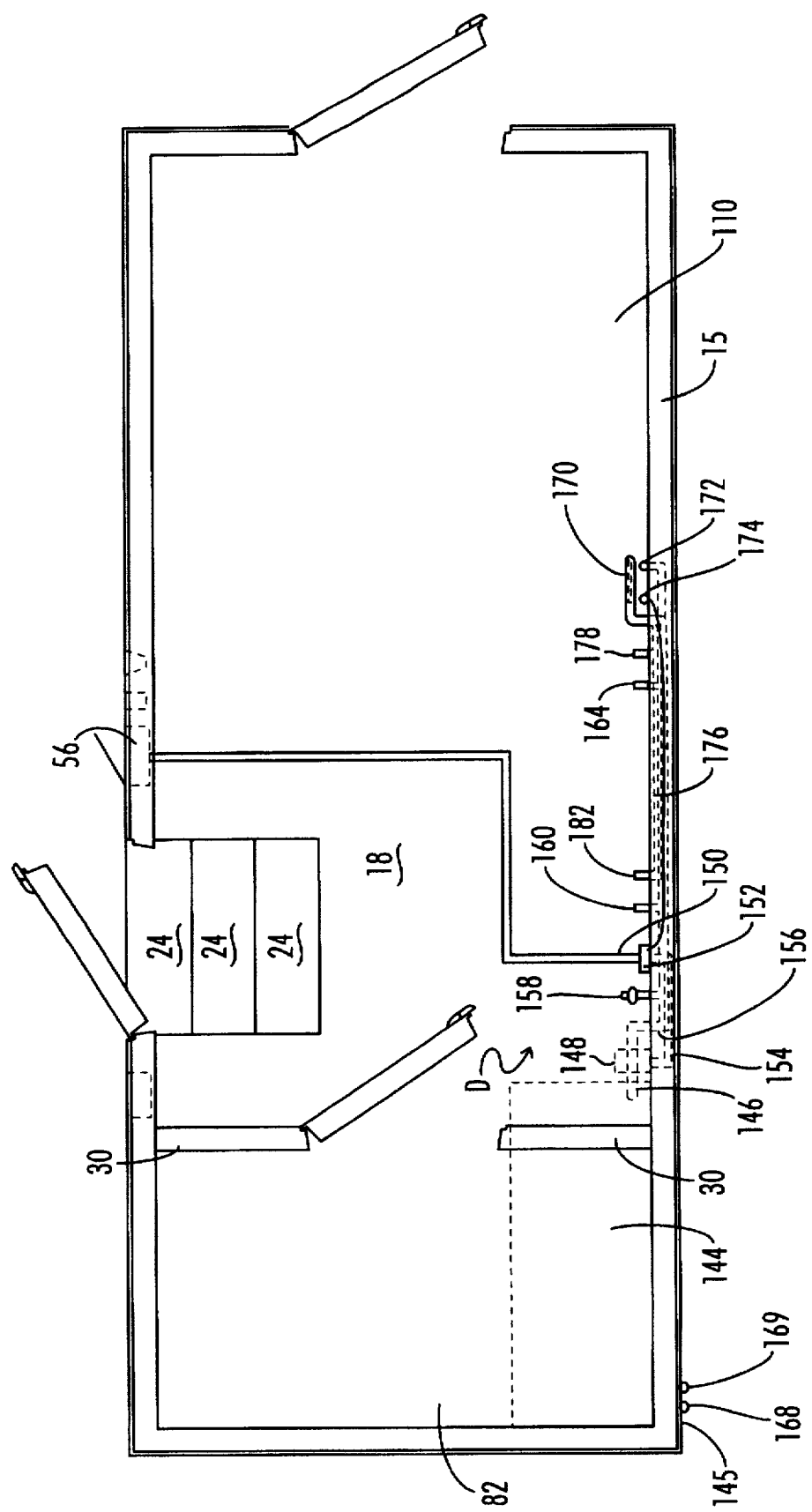
FIG. 4 is a top cut away view of the mobile seafood processing unit of this invention which depicts the water tank and plumbing of this invention.

Referring now to FIGS. 4 and 9, plumbing system D includes a water tank 144 is mounted under truck body 12 beneath the front left side 145. Tank 144 is 65.5 inches wide by 30 inches high by 30 inches deep and includes 1 inch of insulation on all sides to prevent water from freezing in the winter. A siphon line 146 is included with tank 144 and is submerged to the bottom of the tank 144. Siphon line 146 also includes a filter at the top. Water pump 148 is mounted to floor 18 above water tank 144 and is attached to siphon line 146. Water pump 148 is capable of pumping four gallons of water per minute and draws 0.06 kW maximum power load. A suitable water pump is manufactured by Shur, 12630 West Minster Avenue, Santa Ana, Calif. 92706, as Model No. 2088-594-156. This model pump is a positive displacement three chamber diaphragm pump. Main power line 150 runs to junction box 152. Power line 154 runs from water pump 148 from junction box 152 through insulated wall 14 to water pump 148. Main water pipe 156 runs through insulated wall 14 about four inches above floor 18 and is 8 feet long. Water spigot 158 is connected to main water pipe 156 by t'ing-off main water pipe 156 approximately 60 inches from bulkhead wall 30 6 inches above floor 18.

As seen in FIGS. 4 and 12, Cold water side 160 of hand sink 162 (seen in FIG. 12) is connected through a t-off from main water pipe 156 72 inches from bulkhead wall 30 and 6 inches above floor 18. Cold water side 164 of three compartment sink 166 (seen in FIG. 12) is connected to water tank 144 with a t-off of main water pipe 156 96 inches from bulkhead wall 30 6 inches above floor 18. Water tank 144 is filled via water hose hook up 168 with air pressure release valve 169.

Continuing on FIG. 4, water heater 170 is mounted to left side wall 15 approximately 114 inches from bulkhead wall 30 and approximately 12 inches above floor 18. Water heater 170 heats water to a temperature of 40° hotter than when the water enters water heater and heats water as needed. Water heater 170 draws approximately 3.1 kW maximum power load. Suitable example of this water heater is manufactured by Shur, 12630 West Minster Avenue, Santa Ana, Calif. 92706, under the trademark "INSTANT FLOW®" water heater.

Continuing on FIGS. 4 and 12, main water pipe 156 ends into water heater 170. A power line 174 runs from junction box 152 through insulated wall 15 to water heater 170. A hot water pipe 176 is run from water heater 170 through insulated wall 15 to a t-off for hook up to the hot water side 178 of three compartment sink 166. Hot water line 176 continues and ends out of insulated wall 14 for hook up to hot water side 182 of hand sink 162.

Figure 5:
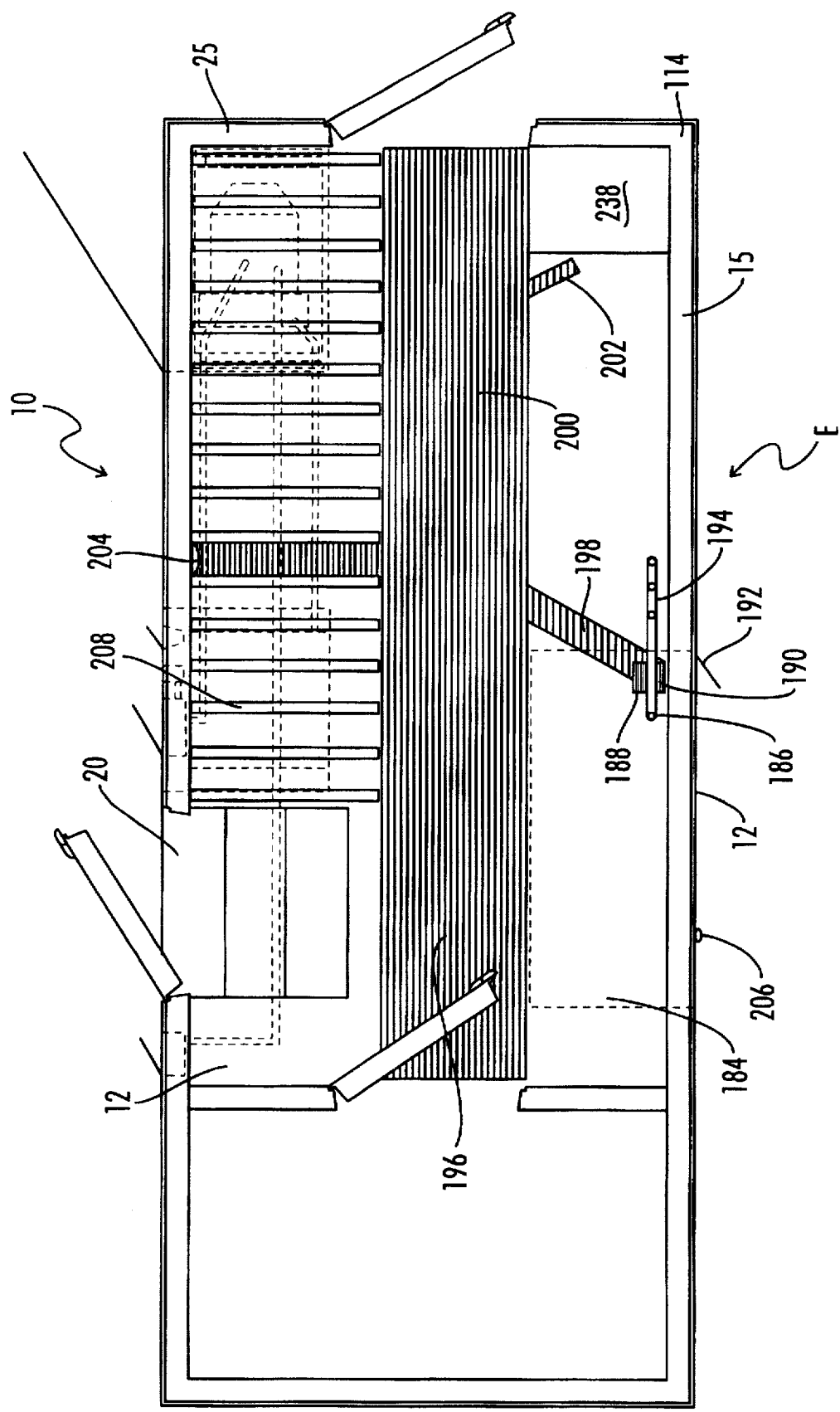
FIG. 5 is a top cut away view of the mobile seafood processing unit of this invention wherein the waste handling system is depicted.

Referring now to FIGS. 5 and 9, waste handling system E includes a septic tank 184 is mounted under truck body 12 1 inch rearward of water tank 144. Septic tank 184 is 65.5 inches wide by 30 inches deep by 30 inches high and includes 1 inch insulation around all sides to prevent freezing in winter. A drain pipe 186 runs from hand sink 162 (not seen in FIG. 5) to septic tank entrance 188. Drain trap 190, a netted steel trap, covers entrance 188 to septic tank 184. Trap 190 catches all large debris and is mounted to slide out through left side wall 15 for cleaning and sanitizing. Door 192 provides access to drain trap 190.

Continuing on FIG. 5, a drain pipe 194 for three compartment sink 166 (not shown in FIG. 5) connects to septic tank entrance 188. A water leader 198 leads all water drainage from cooler floor 196 to septic tank entrance 188. Cooler floor 196 is recessed with a 10° slope from right side to left side towards center, respectively, to ensure proper flow of water drainage into septic tank 184. Floor 196 is covered with stainless steel grate 200 to ensure proper drainage of water and to revive for a non-slip floor surface. Grate 200 is removable for cleaning and sanitizing. A drain leader 202 is also provided from ice bin 238 to recess floor 196. An additional drain leader 204 is provided from cooler shelves 232, 234 and 236 166 (not shown in FIG. 5). Leader 204 is a PVC pipe split in half mounted against right side wall 14 and centered between side step entrance 20 and rear wall 25. Slits are cut into drain leader pipe 204 at each shelf level to direct drainage of water to recess floor 196 without draining from shelf to shelf. A septic tank emptying valve 206 is also provided. Valve 206 can be hooked up to a hose for proper drainage of septic tank 184 and for daily cleaning and sanitizing.

Continuing on FIG. 5, raised strips 208 are provided under shelves 232, 234 and 236 (not shown in FIG. 5). These strips 208 are 2 inches wide by 1 inch high by 34 inches long. They are approximately 8 inches apart and lie along floor 18 between side step entrance 20 and rear wall 25. Strips 208 are used for under shelf storage for boxed products such as oysters. Strips 208 keep box products off of floor 196.

Figure 6:
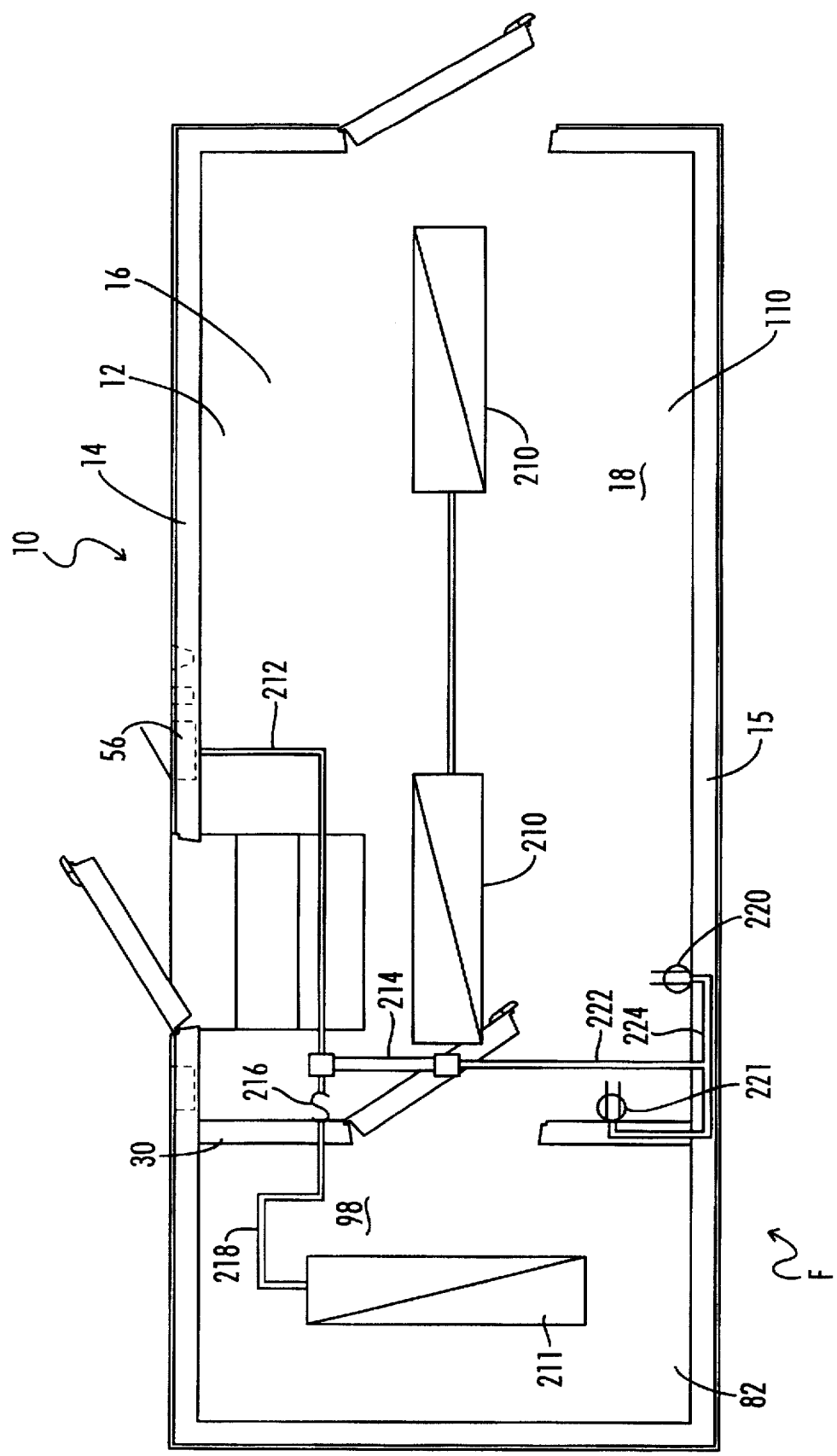
FIG. 6 is a top cut away view of the mobile seafood processing unit of this invention wherein the lighting system is depicted.

Referring now to FIG. 6, the lighting system F of the unit 10 as found in cooler section 110 and freezer section 82 is depicted. Two fluorescent lights 210 are mounted in cooler section 110 and are situated down the center of ceiling section 134 of cooler section 110. An additional fluorescent light 211 is mounted in freezer compartment 82 and particularly is located in the center of the ceiling of freezer section 82. The maximum load for all three lights is 0.25 kW. Power lines 212 run from main breaker box 56 up through insulated right side wall 14 to ceiling 16 across through ceiling 16 to junction boxes 214 and to cooler section lights 210. An on/off switch 216 is provided for freezer fluorescent light 211. The switch 216 is connected to junction box 214 via power lines 212 that run through ceiling 16 down through bulkhead wall 30. Power line 218 runs from on/off switch 216 back through bulkhead wall 30 to ceiling 16 across to freezer light 211.

Continuing on FIG. 6, power receptacles for the freezer section 82 and the cooler section 110 are also depicted. A first receptacle 220 is located in cooler section 110 on left side wall 15 to approximately 36 inches rearward from bulkhead wall 30 and 48 inches up from floor 18. A second receptacle 221 is located on bulkhead wall 30 approximately 24 inches inward from left side wall 15 and 48 inches above floor 18. Power line 222 runs from junction box 214 through ceiling 16 to left side wall 15 down through wall 15 to receptacle 220. Additional power line 224 runs from receptacle 220 through insulated wall 15 to bulkhead wall 30 and to receptacle 221.

Figure 7:
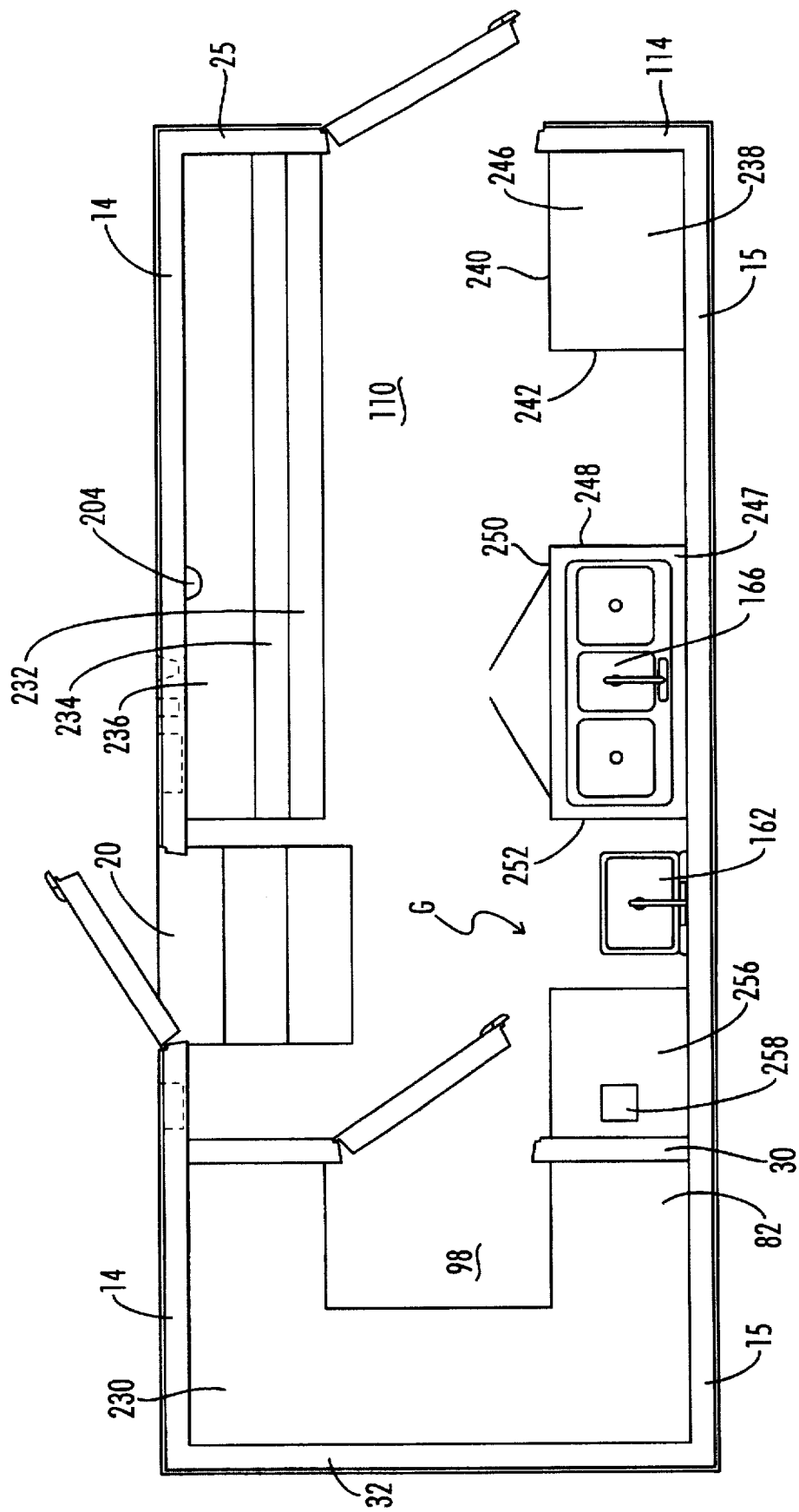
FIG. 7 is a top cut away view of the mobile seafood processing unit of this invention wherein the storage and processing features of this system are depicted.

Referring now to FIG. 7 and 12, there are three shelves 226, 228 and 230 mounted within freezer section 82. Shelves 226, 228 and 230 are wrap around style to cover all three walls, 14, 32 and 15 in freezer section 82. Shelf 226 is 24 inches above freezer floor section 98 and is 24 inches deep. Shelf 228 is 48 inches above floor section 98 and is 24 inches deep. Shelf 230 is 72 inches above floor section 98 and is 24 inches deep.

Continuing on FIGS. 7 and 13, cooler shelves 232, 234 and 236 are located along right side wall 14 of cooler section 110 between side step entrance 20 and rear wall 25. Shelf 232 is 24 inches above floor 196 and is 36 inches deep with a 6 inch lip. Shelf 232 will have a 10° slope to center wall drain 204. Cooler shelf 234 is mounted above shelf 232 and is 46 inches above floor 196, 24 inches deep with a 5 inch lip. Shelf 234 also has a 10° slope towards center wall drain 204. Cooler shelf 236 is mounted above shelf 234 and is 64 inches off the floor 18, 12 inches deep, and has a 4 inch lip. Cooler shelf 236 also includes a 10° slope to center wall drain 204.

Continuing on FIGS. 7 and 12, an ice bin 238 is located in the rear left side corner 114 of cooler section 110. Ice bin 238 is built into corner 114 and thus only two additional walls 240, 242 are installed to define ice bin 238. First of all, wall 240 is 36 inches long and extends in order towards bulkhead wall 30 from rear wall 25. First wall 240 extends outward from rear wall 25 at a point approximately 24 inches inward from left side wall 15. First wall 240 is 36 inches high. Second wall 242 extends inward from left side wall 15 and is attached at the end 244 of first wall 240. Both walls 240 and 242 are 2 inches thick. A hinge lid 246 is also attached on top of bin 238.

Continuing with FIGS. 7 and 12, the food processing station G is described. Food processing station G includes a three compartment vanity 247 is formed with three walls 248, 250 and 252. All three walls, 248, 250 and 252 are 36 inches high and side walls 248 and 252 extend inward from left side wall 15 approximately 24 inches. Front wall 250 is 48 inches long with doors 254 to access a dry storage area under three compartment sink 166. Three compartment sink 166 is installed into vanity 247 and is attached to water pipes and drain pipes as more fully described above. The vanity is positioned approximately 12 inches from ice bin 238 towards bulkhead wall 30. The walls 248, 250 and 252 of vanity 247 are 2 inches thick for strength.

Continuing on FIG. 7, within cooler area 110, walls 14, 15 and 25, ceiling 16, floor 196, shelves 232, 234, 236, ice bin 238 and vanity 247 are completely sealed with fiberglass and painted white with marine paint and coated with a non-porous clear sealant. This provides a non-corrosive, rust-proof environment. This procedure is done prior to installing any stainless steel equipment.

Continuing on FIGS. 7 and 12, hand sink 162 is mounted on left side wall 15 approximately 36 inches up from floor 18 and approximately 6 inches towards bulkhead wall 30 from three compartment sink 166. Sink 162 will be connected to plumbing and drainage pipes as described above. Optionally, foot pedals to operate water flow can also be attached.

A stainless steel workbench 256 is located between hand sink 162 and bulkhead wall 30 and is clamped to left side wall 15 to ensure stability. An electronic scale 258 is placed on top of workbench 256 and is plugged into receptacle 221 (seen in FIG. 7) for operation. Additionally, a lap top computer can be placed on workbench 256 and used in conjunction with the unit 10 of this invention to record transactions to track batches of seafood and to otherwise maintain the sale and transportation records of unit 10. The inclusion of a lap top computer system will enable batches of seafood to be more adequately tracked in the unfortunate event that a batch of seafood is tainted or otherwise causes problems with consumers. Indeed, this is an additional benefit of the unit 10.

Figure 11:
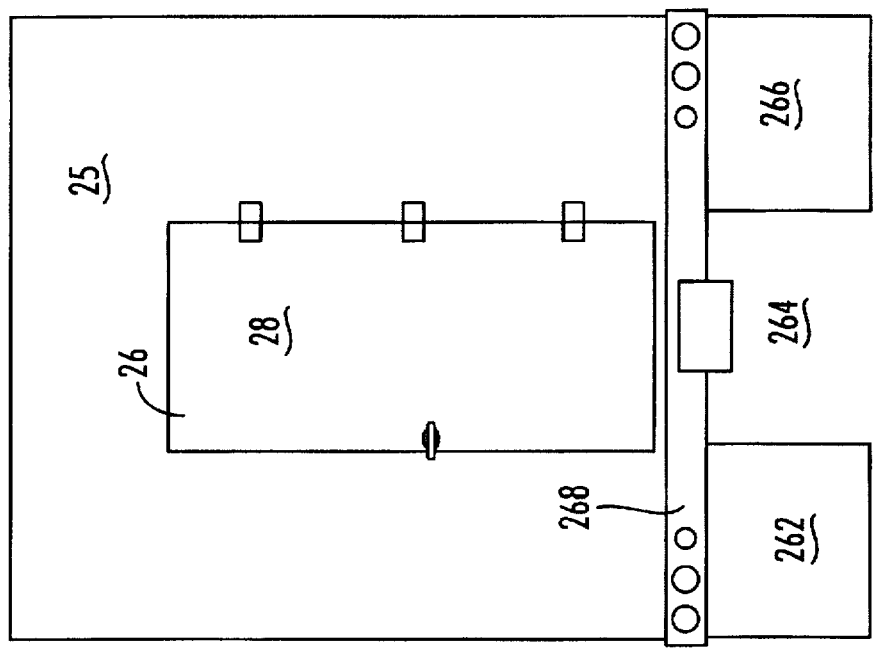
FIG. 11 is a rear view of the mobile seafood processing unit of this invention.
Figure 10:
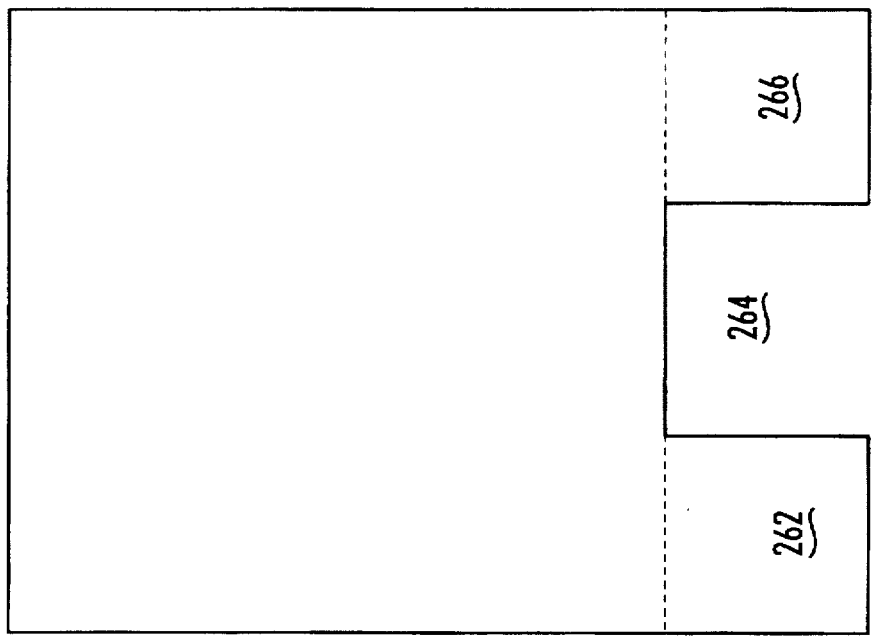
FIG. 10 is the front view of the mobile seafood processing unit of this invention.

Referring now to FIGS. 10 and 11, a front and a rear view of the unit 10 of this invention is presented. Left side compartment sections 262 are generally depicted wherein the left side compartment sections are 30 inches wide by 30 inches tall. A center section 264 is also depicted and is where the truck chassis mounts under truck body 12. Thus, truck body 12 can be adapted to fit any standard truck chassis. Thus, one way to accomplish the mobility of the unit is to mount it on a truck chassis which includes the standard and well known locomotion system, i.e. engine, drive shaft and transmission, wheels, tires and axles, as well as a place to house the driver that includes standard and well known ignition system, steering and transmission operating levers. A right side compartment section 266 is also generally shown wherein the 14 section 266 is also 30 inches wide by 30 inches tall. Unit 10 also includes a rear bumper 268.

Thus, in use, the user drives the mobile unit 10 to, for example, a restaurant, the chef or other proprietor of the restaurant can enter through side step entrance 20 and review fresh seafood on shelves 232, 234, 236 in cooler section 110. The chef can also review frozen seafood in freezer section 82. The chef can then select the appropriate cuts of seafood which then can be processed by the user of the unit 10 on workbench 256 using appropriate utensils. The restaurant proprietor then takes his seafood selection into the restaurant for use in preparation of meals. The sales transaction can be recorded using the lap top computer or other transaction record keeping system. The user then cleans up workbench 256 and washes utensils in three compartment sink 166 according to Hazardous Analysis Critical Control Point (HACCP) regulations. The user can then wash his/her hands in hand sink 162. Then the user can move the mobile unit 10 to the next location. This type of on-site direct review of the seafood product by the restaurant proprietor would discourage abuses in the industry such as the false labeling of cheaper pieces of seafood for more expensive pieces in that the proprietor can select a whole fish that can then be processed in the mobile unit 10 itself.

Thus, although there have been described particular embodiments of the present invention of a new and useful mobile seafood processing unit, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A mobile seafood processing unit comprising an insulated body with at least one user access door and adapted to be transported by a vehicle; a refrigeration system for refrigerating said processing unit; a septic tank waste handling system; a seafood processing station, the seafood processing station located within said insulated body and proximate to the refrigeration system and including a workbench and a sink having multiple compartments in cooperative operation with the septic tank waste handling system; and a power system wherein the refrigeration system, the septic tank waste handling system, the seafood processing station, and the power system are each located within the insulated body whereby the processing unit is characterized by being self-contained and capable of processing fresh seafood independently of the vehicle.

2. The mobile seafood processing unit according to claim 1 wherein the refrigeration system further comprises a cooler section and a freezer section.

3. The mobile seafood processing unit according to claim 1 wherein the septic tank waste handling system is connected to a series of drains in operative communicative with the seafood processing station.

4. The mobile seafood processing unit according to claim 3 further comprising a lighting system mounted within the insulated body.

5. The mobile seafood processing unit according to claim 4 further comprising at least one step mounted within the at least one access door.

6. The mobile seafood processing unit according to claim 5 further comprising an additional access door.

7. The mobile seafood processing unit according to claim 6 wherein the additional access door is mounted along a rear wall of the body and the first user access door is formed in a side wall of the body.

8. The mobile seafood processing unit according to claim 2 wherein the seafood processing station further comprises at least one shelf mounted in a cooling section and at least one shelf mounted in a freezer section of the refrigeration system.

9. The mobile seafood processing unit according to claim 1 wherein the power system comprises a generator.

10. The mobile seafood processing unit according to claim 1 further comprising a receptacle for connecting the power system of the mobile seafood processing unit to an external power source.

11. The mobile seafood processing unit according to claim 1 further comprising an ice bin mounted within the body.

12. A mobile seafood processing unit comprising an insulated body with at least one user access door; a refrigeration means for refrigerating the unit; a septic tank waste handling means for handling contaminated fluid and solid debris waste; a seafood processing means for processing seafood, the seafood processing means located within said insulated body and proximate to the refrigeration means and including a workbench and a sink having multiple compartments in cooperative operation with the septic tank waste handling means; and a power means for powering the unit, whereby the processing unit is characterized by being self-contained and capable of processing fresh seafood independently of the vehicle.

13. The mobile seafood processing unit according to claim 12 wherein the body further comprises a cooler section and a freezer section, and the refrigeration means comprises a compressor mounted in the cooler section and the freezer section.

14. The mobile seafood processing unit according to claim 12 wherein the septic tank waste handling means is connected to a series of drains in operative communication with the seafood processing means.

15. The mobile seafood processing unit according to claim 12 further comprising lighting means for lighting the unit mounted within the insulated body.

16. The mobile seafood processing unit according to claim 12 further comprising at least one step mounted within the at least one access door.

17. The mobile seafood processing unit according to claim 16 further comprising an additional access door.

18. The mobile seafood processing unit according to claim 17 wherein the additional access door is mounted along a rear wall of the body and the first user access door is formed in a side wall of the body.

19. The mobile seafood processing unit according to claim 13 further comprising at least one shelf mounted in the cooling section and at least one shelf mounted in a freezer section.

20. The mobile seafood processing unit according to claim 12 wherein the power means comprises a generator and a series of power lines.

21. The mobile seafood processing unit according to claim 20 further comprising a receptacle for connecting the power means of the mobile seafood processing unit to an external power source.

22. The mobile seafood processing unit according to claim 12 further comprising an ice bin mounted within the body.

* * * * *